March 22, 1966     S. G. WINTERS     3,241,887
TILLER DRIVE WHEEL
Filed July 21, 1964
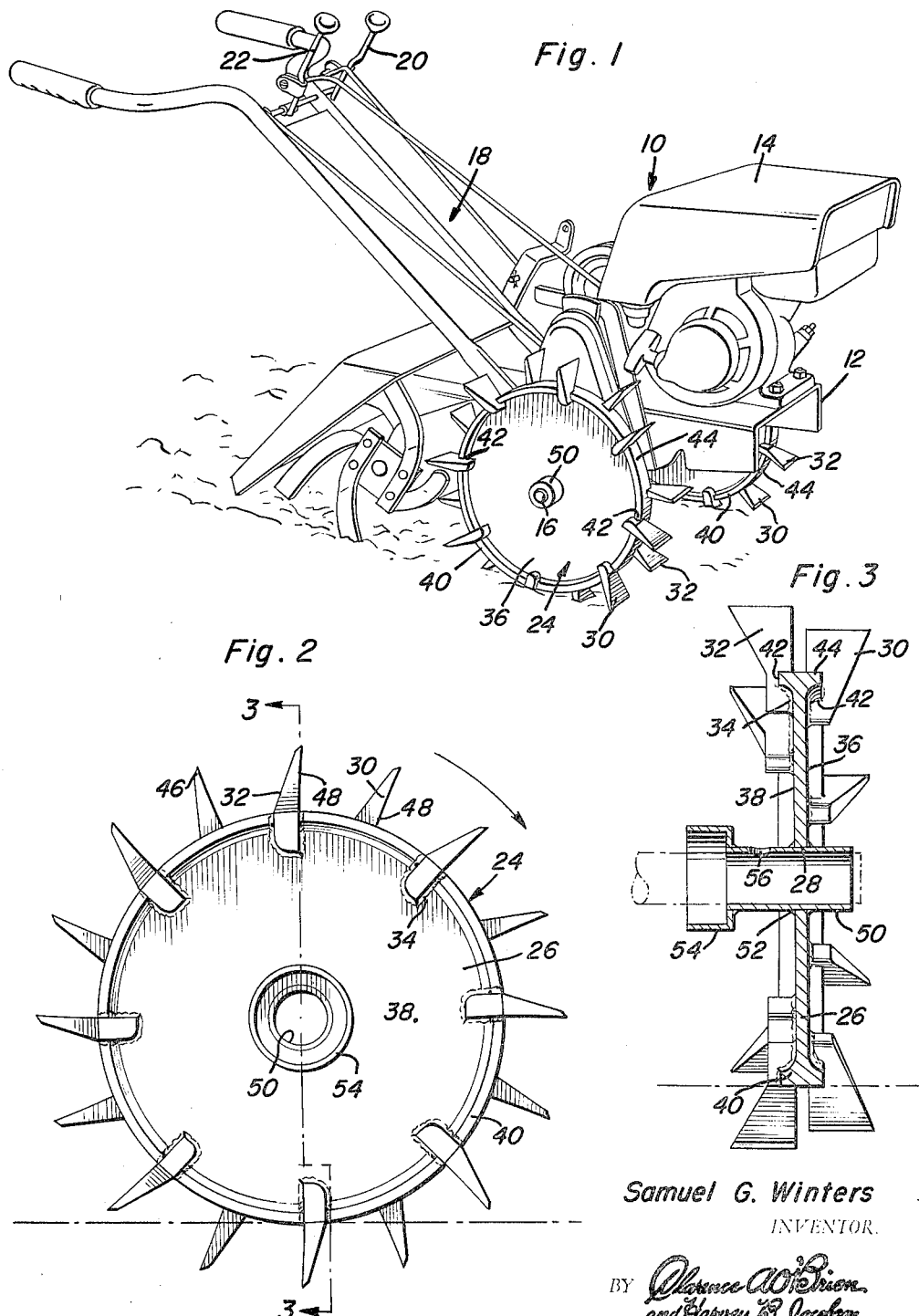
Samuel G. Winters
INVENTOR.

United States Patent Office 3,241,887
Patented Mar. 22, 1966

3,241,887
TILLER DRIVE WHEEL
Samuel G. Winters, Box 265, Reform, Ala.
Filed July 21, 1964, Ser. No. 384,156
2 Claims. (Cl. 301—43)

This invention relates to a novel and useful tiller drive wheel and more specifically to a drive wheel designed primarily for use on the drive axle or axles of a power tiller or cultivator and the like.

Many types of power tillers or cultivators are of the "walking" type provided with a pair of opposite side ground-engaging drive wheels providing the sole support for the tiller or cultivator. These "walking" garden tractors or tillers are provided with a rearwardly and upwardly inclined handle assembly which supports various controls such as the throttle and clutch controls for the power tiller and the handle also serves as a means for the operator of the tiller to steady the same during its operation and to guide the tiller. Most garden tractors or tillers are provided with ground-engaging drive wheels including tread portions or shallow lugs which provide ample traction under ideal ground conditions. However, when other than ideal ground conditions exist, the traction afforded by conventional ground-engaging drive wheels of a garden tractor or tiller is not sufficient to insure that an equal amount of driving power will be afforded by the ground engaging wheels. Should the conventional type of ground engaging supporting and driving wheels encounter portions of the surface of the ground which have been baked and have become hard, it is possible for one of the drive wheels to afford many times the driving traction afforded by the other drive wheel. In this instance, the walking tractor or tiller has a strong tendency to turn and the operator of the tiller must utilize the aforementioned rearwardly and upwardly inclined handle assembly to retain the garden tractor on its desired path. Accordingly, the operator of a garden tractor or tiller of the walking type must constantly be ready to overcome highly unbalanced driving forces effected by the opposite side drive wheels of the tractor.

The main object of this invention is to provide a tiller drive wheel for walking garden tractors or tillers constructed in a manner whereby the traction afforded by each of the wheels will be far greater than the traction afforded by conventional garden tractor wheels and therefore drive wheels which will have very little tendency to spin in relation to the ground surface with which they are engaged. In this manner, circumferential movement of the drive wheels of the instant invention a given distance will result in movement of each of the drive wheels approximately the same distance over the surface of the ground which supports a corresponding walking tiller and therefore it may be seen that in only the most extreme cases will the operator of a walking garden tractor or tiller provided with the tiller drive wheels of the instant invention will be called upon to utilize the rearwardly and upwardly inclined handle of the walking garden tractor to maintain the desired direction of movement of the tractor or tiller.

Another object of this invention, in accordance with the immediately preceding object, is to provide a tiller drive wheel which will provide far increased traction over conventional types of walking tractor drive wheels and yet which will occupy less space and therefore provide greater space for attaching the various ground working attachment to the associated walking garden tractor or tiller.

Yet another object of this invention is to provide a tiller drive wheel in accordance with the preceding objects that may be readily utilized as replacements for existing conventional drive wheels.

Another object of this invention is to provide a tiller drive wheel designed primarily to provide increased driving traction and to afford substantially even amounts of driving traction when the wheels are used in pairs and disposed on opposite sides of a walking garden tractor or tiller.

A final object of this invention to be specifically enumerated herein is to provide a tiller drive wheel in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional form of walking garden tractor shown with a pair of the tiller drive wheels of the instant invention operatively mounted thereon;

FIGURE 2 is a side elevational view of one of the tiller drive wheels; and

FIGURE 3 is a transverse vertical sectional view taken substantially upon the plane indicated by the section line 3—3 of FIGURE 2.

Referring now more specifically to the drawings the numeral 10 generally designates a conventional form of walking garden tiller including a main frame section 12 from which a prime mover 14 is operatively supported. The main frame 12 rotatably journals a pair of axle members 16 to which the prime mover 14 is operatively connected and the rear portion of the frame 12 is provided with a rearwardly and upwardly directed handle assembly generally referred to by the reference numeral 18 including various operating controls 20 and 22 for the walking garden tiller 10.

The tiller drive wheel of the instant invention is generally referred to by the reference numeral 24 and it may be seen from FIGURE 1 of the drawings that a pair of the drive wheels 24 are mounted on the drive axles 16 for rotation therewith.

Each of the tiller drive wheels 24 comprises a circular disk body portion 26 including a center opening 28.

Two sets of chisel-like driving lugs 32 and 32 are secured to opposite side surface of the disk 26 in any convenient manner such as by welding 34. The lugs 30 and 32 are spaced circumferentially about the corresponding side surface of the disk 26 and it may be seen from FIGURE 2 of the drawings that the lugs 30 and 32 are alternately spaced about the circumference of the disk 26.

The opposite side surfaces 36 and 38 of the disk 26 are dished so as to form an axially thickened outer annular marginal edge portion 40 and it may be seen that each of the lugs 30 and 32 is notched as at 42 so as to be disposed in surface-to-surface contacting engagement with the corresponding side face of the disk 36 and also a portion of the outer circumferential edge 44 of the disk 26.

The lugs 30 and 32 are panel-like in configuration and include sharpened outer edges 46. In addition, it may be seen that the forward face 48 of each of the lugs 32 and 30 is contained in a plane disposed normal to the medial plane of the disk 26 and extending along a diameter of the disk 26.

A cylindrical hub portion 50 is secured through the opening 28 in any convenient manner such as by welding 52 and includes a diametrically enlarged end portion 54 on one end. In addition, the cylindrical hub portion 50 has a radial bore 56 formed therein which is disposed between the diametrically enlarged portion 54 and the disk 26.

In operation, the conventional drive wheels (not shown) may be removed from the driving axles 16 and replaced by the drive wheels 24. The openings 56 are utilized to receive a keying member for retaining the associated tiller drive wheel 24 on the corresponding drive axle and to key the associated drive wheel 24 to that axle for rotation therewith.

Inasmuch as the axial extent of each of the tiller drive wheels 24 is considerably less than the axial extent of conventional tiller drive wheels such as those provided with pneumatic tires, the spacing between the inner surfaces of the drive wheels 24 is increased and therefore more room is provided for performing maintenance on the prime mover 14 and removing attachments from and securing other attachments to the power tiller 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tiller drive wheel for use on a drive axle of a power tiller or cultivator and the like, said tiller drive wheel including a generally annular outer peripheral portion and a central portion including means adapting said wheel for securement to said axle for rotation therewith, said outer peripheral portion including a first radially outer circumferentially extending rim of a given axial thickness and a second portion disposed radially inwardly of said first portion of reduced axial thickness, said second portion including opposite side surfaces recessed inwardly of the corresponding opposite side surfaces of said first portion, two sets of chisel-like driving legs secured to corresponding opposite side portions of said rim and said second portion and also including portions overlying and secured to the corresponding side of the outer peripheral edge of said rim, said lugs each being generally panel-like in configuration and disposed in a plane extending generally radially of said wheel and generally paralleling the center axis thereof, said lugs each having notches formed therein spaced inwardly of their radial outermost ends and including edge surface portions conforming to the shape and contour of, disposed in surface-to-surface contacting relation with, and secured to the adjacent side surface portions of said first and second portions and the adjacent portions of the outer peripheral edge of said rim, said notches seatingly receiving the adjacent corresponding side portions of said rim, the lugs of said sets of lugs being alternately staggered about the circumference of said rim and disposed entirely on the corresponding side of the medial plane of said wheel.

2. The combination of claim 1 wherein said lugs each include edges facing away from the corresponding side surface of said wheel which are radially inwardly inclined toward the medial plane of said wheel.

References Cited by the Examiner

UNITED STATES PATENTS

| 1,139,968 | 5/1915 | Hamilton | 301—44 |
| 1,936,807 | 11/1933 | Tomlinson | 301—43 |
| 2,292,281 | 8/1942 | Merolo | 301—44 |

FOREIGN PATENTS 108,301   9/1939   Australia.

BENJAMIN HERSH, *Primary Examiner.*

R. J. JOHNSON, *Assistant Examiner.*